United States Patent [19]

Suzuki et al.

[11] Patent Number: 4,462,671
[45] Date of Patent: Jul. 31, 1984

[54] CAMERA WARNING SHAKE SYSTEM

[75] Inventors: Kiziro Suzuki, Hamura; Yoshiharu Takahashi, Hachioji, both of Japan

[73] Assignee: Konishiroku Photo Industry Co., Ltd., Japan

[21] Appl. No.: 333,053

[22] Filed: Dec. 21, 1981

[30] Foreign Application Priority Data

Dec. 24, 1980 [JP] Japan .................. 55-181828

[51] Int. Cl.³ ........................... G03B 7/08
[52] U.S. Cl. ........................... 354/430
[58] Field of Search ............ 354/25, 31, 60 R, 430

[56] References Cited

U.S. PATENT DOCUMENTS

| | | | |
|---|---|---|---|
| 3,399,307 | 8/1968 | Levin | 354/31 |
| 4,246,476 | 1/1981 | Stauffer | 354/31 |
| 4,264,161 | 4/1981 | Hosoe et al. | 354/31 |
| 4,273,430 | 6/1981 | Fritsche et al. | 354/31 |
| 4,320,948 | 3/1982 | Hosoe et al. | 354/31 |

FOREIGN PATENT DOCUMENTS

| | | | |
|---|---|---|---|
| 2738804 | 3/1979 | Fed. Rep. of Germany | 354/31 |
| 54-163032 | 12/1979 | Japan | 354/31 |
| 55-106442 | 8/1980 | Japan | 354/31 |

*Primary Examiner*—Russell E. Adams
*Attorney, Agent, or Firm*—Finnegan, Henderson, Farabow, Garrett & Dunner

[57] ABSTRACT

A camera has a taking lens and a charge-coupled device that detects light through the lens. A warning signal generating circuit includes a capacitor, comparator and an LED or buzzer actuated by the output from the comparator. The reference voltage associated with the capacitor is variable to provide warning time limits commensurate with taking lenses of different focal length.

3 Claims, 5 Drawing Figures

CAMERA WARNING SHAKE SYSTEM

BACKGROUND OF THE INVENTION

1. Field of the Invention

The present invention relates to a means for warning of camera shakiness caused by hand. In particular, the invention relates to automatically focussing type cameras, in which a charge-coupled device (hereinafter referred to as CCD) is used for the detection of focussing.

2. Description of the Prior Art

There has been public knowledge of cameras in which CCD is used for the photoelectric element for the detection of focal points. As is generally known, by means of automatic gain control such CCD holds electric charge until the stored quantity of light reaches a certain level, and then starts the transfer at the point of time when a certain amount of charge is stored. Accordingly, the proportional relation as shown in FIG. 1 is established between luminance at a focal point detection part and the time accumulated.

SUMMARY OF THE INVENTION

One of the objects of the present invention is to give a warning for camera shakiness when the said quantity of electric charge stored within a certain period of time does not reach the level required to start a transfer by utilizing such period of time for storing the quantity of light in CCD.

DESCRIPTION OF THE PREFERRED EMBODIMENTS

Figure 2:
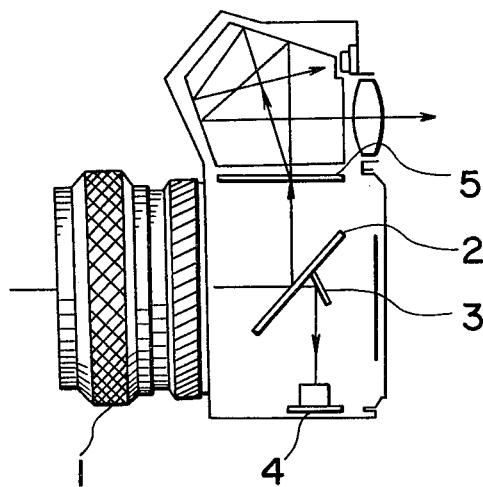
FIG. 2 is a cross-sectional view of a camera embodying the invention.

FIG. 2 illustrates one example in which the present invention is embodied in a single-lens-reflex camera. After, the ray of light for taking a photograph having passed through taking lens 1 is reflected by quick-return-mirror 2, of which the central portion is provided with a semi-transparent mirror, an image is made on a focussing glass. At the same time a luminous flux is transmitted through the semi-transparent mirror to form an image a CCD 4, which is provided at the position corresponding to the focal point by interposing auxiliary mirror 3. Thus, the focal point is detected.

Figure 1:
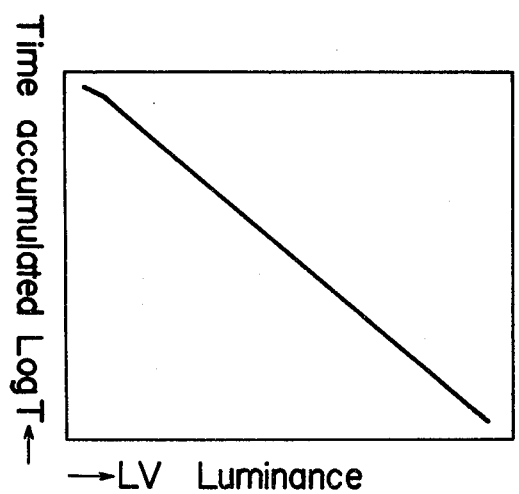
FIG. 1 is a graph expressing the relation between time accumulated (storage time) and quantity of light (luminance)

If the luminance of a subject is low, as is obvious from FIG. 1, it takes a long time before the charge transfer is started. To cope therewith, in the case that a transfer is not started within a certain period of time from the start of storing quantity of light in CCD, a warning to the operator to check for camera shakiness caused by a shaking hand, is to be given. Generally, the time for utilizing the image made on CCD to detect focus should be less than 200 msec, assuming that the focal length of the taking lens is 50 mm, lest inaccurate focus detection should occur because of camera shakiness caused by hand.

Figure 3:
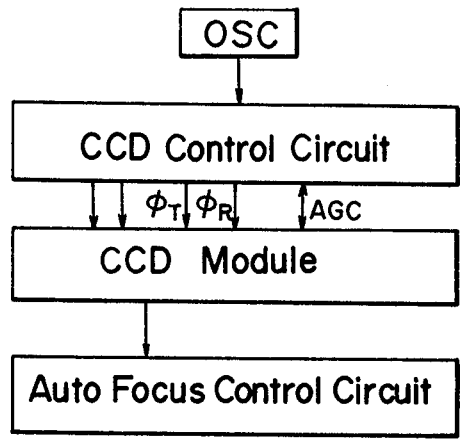
FIG. 3 and FIG. 4 are the examples of the warning signal generating circuits of the invention.

The circuit, which is used in the invention and exhibited diagrammatically, is shown in FIG. 3. A concrete example of the warning signal generating circuit is shown in FIG. 4, and the operational conditions thereof are shown in FIG. 5.

In FIG. 3, CCD control circuit receives clock-pulses from an oscillator OSC. CCD module 4 starts the storing upon receipt of reset signal $\phi R$. On the other hand, an automatic gain control (AGC) signal is given in the form of an analog voltage and said voltage is reduced in proportion to the quantity of light from the time when the CCD starts the storing and, at the point of time when said voltage reached a certain value (e.g. 0), a transfer start signal $\phi T$ is given.

Figure 4:
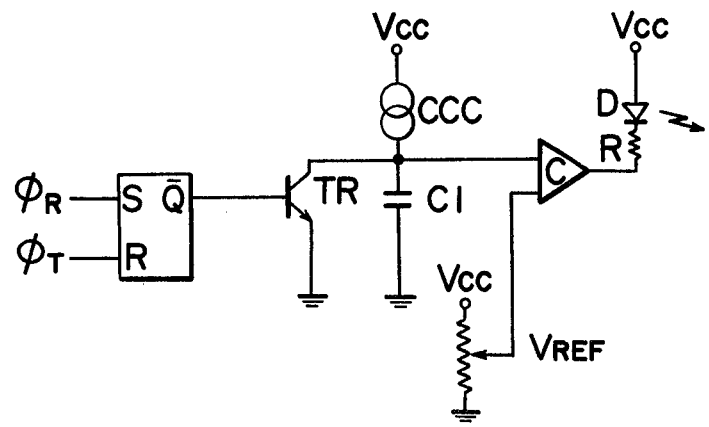
Figure 5:
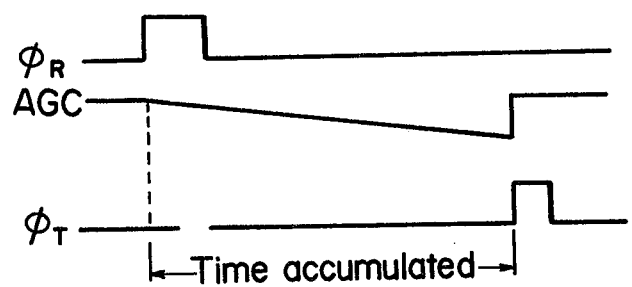
FIG. 5 is a timing chart.

In FIG. 4, R-S flip-flop (FF) is set by receiving reset signal $\phi R$ and is reset by receiving transfer start signal $\overline{\phi T}$. Transistor Tr is switched on and off by output $\overline{Q}$ from R-S FF. When transistor Tr is switched off by receiving reset signal $\phi R$, the charging of capacitor C1 is started by a constant-current source. This charging voltage is compared, as described hereunder, with reference voltage $V_{REF}$ that is variable according to the lenses, etc. which may be used, by means of comparator C.

When a subject has a sufficient luminance, transistor Tr is switched on by receiving transfer start signal $\phi T$ before the charging voltage for capacitor C1 reaches reference voltage $V_{REF}$. When a subject has a low luminance, the charging voltage for capacitor C1 rises above reference voltage $V_{REF}$ because of the delayed issuance of transfer start signal $\phi T$ that makes charging of capacitor C1 stop. This fact means that storage time in CCD is being delayed and there is the possibility that the hand holding the camera will begin shaking. Thus, a warning device D, such as a LED or buzzer, is actuated by the output from comparator C and an alarm is given.

Shutter times required to compensate for the shakiness caused by hand holding of the camera vary depending on the focal distances of the taking lenses used. When a lens with long focal length is used, a short shutter time should applied lest inaccurate focus detection should be occur because of camera shakiness by hand. Accordingly, if a bleeder resistance R is built-in a lens, or if focal length information is sent to variable resistor R by means of a pin provided to a lens and the reference voltage $V_{REF}$ is varied according to the interchangeable lenses, it is possible to adjust suitably the warning time limit.

As described above, in the present invention it is possible to indicate that a subject luminance is below a certain limit, by utilizing the storage time in CCD that is a focus detecting element. Accordingly, it is possible to warn not only that there is a possibility of causing a shakiness by hand because of the long time exposure on taking a photograph in aperture priority mode but also that there is a possibility of lowering the focal point detection accuracy because of a prolonged storage time in CCD and because of a shakiness by hand. Moreover, the present invention can be applied effectively not only to automatically focussing type cameras, but also to cameras having a rangefinder utilizing a focussing system in which a focal point is detected electrically.

What is claimed is:

1. In a camera having a taking lens and a charge-coupled device for achieving focus detection, a system for warning the operator of the camera of camera shakiness caused by shaking of the operator's hand holding the camera, comprising:

means for warning when the amount of electric charge stored in the charge-coupled device during a predetermined period of time fails to reach a predetermined amount of electric charge.

2. A camera shake warning system as set forth in claim 1, also including means for varying said predetermined period of time in accordance with a focal length of the taking lens.

3. A camera shake warning system as set forth in claim 1 or 2 wherein said predetermined amount of electric charge in the amount at which the charge-coupled device starts transfer of the stored electric charge.

* * * * *